(12) United States Patent
DeFelice et al.

(10) Patent No.: US 10,823,087 B1
(45) Date of Patent: Nov. 3, 2020

(54) INLINE VALVES, GAS TURBINE ENGINES WITH INLINE BLEED VALVES, AND METHODS CONTROLLING FLOW THROUGH INLINE VALVES

(71) Applicant: Hamilton Sundstrand Corporation, Charlotte, NC (US)

(72) Inventors: Robert DeFelice, South Windsor, CT (US); Peter J. Dowd, Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/447,780

(22) Filed: Jun. 20, 2019

(51) Int. Cl.
*F02C 9/18* (2006.01)
*F16K 1/12* (2006.01)

(52) U.S. Cl.
CPC .............. *F02C 9/18* (2013.01); *F16K 1/126* (2013.01); *Y10T 137/3367* (2015.04); *Y10T 137/3421* (2015.04); *Y10T 137/3476* (2015.04)

(58) Field of Classification Search
CPC ......... Y10T 137/3367; Y10T 137/3421; Y10T 137/3476; F04D 27/0215; F02C 6/08; F02C 9/18; F16K 31/50; F16K 1/126; F16K 31/1223; F16K 31/1226; G05D 7/0133; G05D 7/0146
See application file for complete search history.

(56) References Cited

U.S. PATENT DOCUMENTS

| | | | | |
|---|---|---|---|---|
| 1,362,331 A | * | 12/1920 | Larner | F16K 1/126 137/219 |
| 1,387,446 A | * | 8/1921 | Astier | F16K 1/12 137/219 |
| 1,441,784 A | * | 1/1923 | Clayton | F16K 1/12 137/330 |
| 1,448,717 A | * | 3/1923 | Slattery | F16K 1/126 137/219 |
| 1,723,736 A | * | 8/1929 | Kruse | F16K 1/126 137/220 |

(Continued)

FOREIGN PATENT DOCUMENTS

| CN | 205534367 U | 8/2016 |
|---|---|---|
| EP | 3056739 A1 | 8/2016 |

OTHER PUBLICATIONS

European Search Report for Application No. 19212821.3, dated Jul. 13, 2020, 11 pages.

*Primary Examiner* — Marina A Tietjen
*Assistant Examiner* — Frederick D Soski
(74) *Attorney, Agent, or Firm* — Cantor Colburn LLP (57) ABSTRACT

An inline valve includes a valve body, a valve member, and a control manifold. The valve body has an exterior, an inlet, and an outlet. The valve member is supported within the valve body and is movable between a first position and a second position. The inlet in fluid communication with the outlet while the valve member is in the first position and the inlet fluidly separated from the outlet while the valve member is in the second position. The control manifold is supported by the valve body, has a reference fluid port and a control fluid port, and is in pneumatic communication with the valve member through the valve body exterior to passive movement of the valve member according to pressure at the valve body inlet. Gas turbine engines and methods of controlling valves are described.

16 Claims, 4 Drawing Sheets

(56) References Cited

U.S. PATENT DOCUMENTS

| | | | | |
|---|---|---|---|---|
| 1,777,060 A * | 9/1930 | Welcker | F16K 1/126 | 137/220 |
| 1,824,916 A * | 9/1931 | Moody | F16K 1/126 | 137/219 |
| 1,829,703 A * | 10/1931 | Larner | F16K 1/126 | 137/219 |
| 1,838,723 A * | 12/1931 | Welcker | F16K 1/12 | 137/220 |
| 1,841,608 A * | 1/1932 | Kruse | F16K 17/32 | 137/220 |
| 1,842,146 A * | 1/1932 | Brotherton | F16K 1/12 | 137/219 |
| 1,856,222 A * | 5/1932 | McClellan | F16K 1/126 | 137/220 |
| 1,941,357 A * | 12/1933 | Kruse | F16K 1/126 | 137/220 |
| 2,085,893 A * | 7/1937 | Boland | F16K 1/126 | 137/219 |
| 2,095,410 A * | 10/1937 | Diescher | F16K 1/12 | 137/220 |
| 2,133,983 A * | 10/1938 | Gaston | F16K 1/12 | 137/219 |
| 2,269,671 A * | 1/1942 | Kinzie | F03C 2/08 | 137/219 |
| 2,442,625 A * | 6/1948 | Thomas | F16K 1/12 | 137/219 |
| 2,608,204 A * | 8/1952 | Dunn | F16K 7/075 | 137/220 |
| 2,914,079 A * | 11/1959 | Hertrich | B04B 9/06 | 137/219 |
| 2,919,714 A * | 1/1960 | Mrazek | F16K 1/126 | 137/220 |
| 2,931,378 A * | 4/1960 | Davies | F16K 24/04 | 137/220 |
| 2,938,533 A * | 5/1960 | Jensen | F16K 1/126 | 137/219 |
| 2,943,636 A * | 7/1960 | Reed | E03B 9/04 | 137/220 |
| 2,950,732 A * | 8/1960 | Lambert | G05D 16/106 | 137/219 |
| 2,996,074 A * | 8/1961 | Page | F16K 31/363 | 137/220 |
| 3,003,516 A * | 10/1961 | Granberg | G01F 15/005 | 137/220 |
| 3,074,685 A * | 1/1963 | Eckert | F16K 47/00 | 251/77 |
| 3,076,471 A * | 2/1963 | Salerno | G05D 7/014 | 137/219 |
| 3,092,132 A * | 6/1963 | Guy | F16K 1/12 | 137/219 |
| 3,092,133 A * | 6/1963 | Clark | F16K 1/126 | 137/220 |
| 3,119,405 A * | 1/1964 | Guy | F16K 1/126 | 137/219 |
| 3,134,394 A * | 5/1964 | Tsunetaro | F16K 15/06 | 137/220 |
| 3,155,108 A * | 11/1964 | Kahn | B64D 13/02 | 137/220 |
| 3,156,253 A * | 11/1964 | Marderness | F16K 1/126 | 137/220 |
| 3,172,420 A * | 3/1965 | Brown | F16K 1/126 | 137/219 |
| 3,177,889 A * | 4/1965 | Hardison | F16K 31/34 | 137/220 |
| 3,192,940 A * | 7/1965 | Wiersholm | G05D 7/03 | 137/220 |
| 3,194,255 A * | 7/1965 | Flaton | F16K 15/06 | 137/220 |
| 3,297,047 A * | 1/1967 | Sime | F16K 1/126 | 137/220 |
| 3,338,259 A * | 8/1967 | Tribe | F16K 1/126 | 137/220 |
| 3,359,998 A * | 12/1967 | Fike | F16K 1/126 | 137/220 |
| 3,380,469 A * | 4/1968 | Salerno | F16K 31/42 | 137/219 |
| 3,399,689 A * | 9/1968 | Keane | F16K 1/126 | 137/220 |
| 3,489,165 A * | 1/1970 | Salerno | G05D 16/166 | 137/220 |
| 3,490,484 A * | 1/1970 | Runton | F16K 1/126 | 137/219 |
| 3,534,769 A * | 10/1970 | Leveque | F16K 31/36 | 137/501 |
| 3,566,907 A * | 3/1971 | Sime | F16K 1/126 | 137/219 |
| 3,583,440 A * | 6/1971 | Andersson | F16K 31/1223 | 137/624.14 |
| 3,586,033 A * | 6/1971 | Hieber | B64D 39/06 | 137/220 |
| 3,617,151 A * | 11/1971 | Scroggins | F16K 1/126 | 417/18 |
| 3,643,685 A * | 2/1972 | Hays | F16K 1/126 | 137/501 |
| 3,643,707 A * | 2/1972 | Ensign | B67D 7/28 | 141/286 |
| 3,792,713 A * | 2/1974 | Zadoo | F16K 1/126 | 137/486 |
| 3,792,716 A * | 2/1974 | Sime | F16K 1/126 | 137/492 |
| 3,825,026 A * | 7/1974 | Salerno | F01D 17/145 | 137/219 |
| 3,865,128 A * | 2/1975 | Zadoo | F16K 1/126 | 137/220 |
| 3,901,266 A * | 8/1975 | Guy | G05D 7/0153 | 137/219 |
| 3,945,393 A * | 3/1976 | Teatini | F16K 1/126 | 137/220 |
| 3,963,044 A * | 6/1976 | Brown | F16K 31/363 | 137/490 |
| 3,987,812 A * | 10/1976 | Nelson | F16K 1/12 | 137/219 |
| 3,993,093 A * | 11/1976 | Mokveld | F16J 15/062 | 137/484.6 |
| 4,052,035 A * | 10/1977 | Kenny | B05B 1/302 | 251/14 |
| 4,077,425 A * | 3/1978 | Drori | F16K 31/363 | 137/219 |
| 4,094,334 A * | 6/1978 | Taylor | E21B 34/10 | 137/219 |
| 4,221,234 A * | 9/1980 | Kruschik | F16L 55/10 | 137/219 |
| 4,226,259 A * | 10/1980 | Szekely | F16K 31/365 | 137/269 |
| 4,285,495 A * | 8/1981 | King | F16K 1/126 | 137/219 |
| 4,373,544 A * | 2/1983 | Goodman | F04D 27/0215 | 137/220 |
| 4,429,709 A * | 2/1984 | Niskanen | G05D 7/03 | 137/220 |
| 4,479,507 A * | 10/1984 | Nichols | B67D 7/301 | 137/219 |
| 4,565,210 A * | 1/1986 | Heine | F16K 1/12 | 137/219 |
| 4,577,654 A * | 3/1986 | Pringle | F16K 1/126 | 137/219 |
| 4,610,265 A * | 9/1986 | Nelson | F16K 1/126 | 137/219 |
| 4,693,268 A * | 9/1987 | Fahl | F16K 1/12 | 137/219 |
| 4,732,189 A * | 3/1988 | Jones | F16K 31/1223 | 137/220 |
| 4,911,196 A * | 3/1990 | Kemp | F16K 15/026 | 137/220 |
| 5,005,602 A * | 4/1991 | Fahl | F16K 1/12 | 137/219 |
| 5,249,599 A * | 10/1993 | Haynes | G05D 7/0133 | 137/501 |

(56) References Cited

U.S. PATENT DOCUMENTS

| | | | | |
|---|---|---|---|---|
| 5,441,171 | A * | 8/1995 | Maury | B65D 88/703 222/3 |
| 5,540,252 | A * | 7/1996 | Bruun | G05D 7/0146 137/220 |
| 5,603,352 | A * | 2/1997 | Tavor | F16K 1/126 137/594 |
| 5,803,356 | A * | 9/1998 | Babinger | F01P 11/16 137/219 |
| 5,826,613 | A * | 10/1998 | Schalk | F16K 1/123 137/219 |
| 5,921,276 | A * | 7/1999 | Lam | F16K 15/026 137/220 |
| 6,029,691 | A * | 2/2000 | Tavor | F16K 1/12 137/219 |
| 6,216,721 | B1 * | 4/2001 | Perez | F16K 1/126 137/219 |
| 6,230,734 | B1 * | 5/2001 | Grebnev | F16K 1/123 137/220 |
| 6,446,657 | B1 * | 9/2002 | Dziorny | F01D 17/105 137/219 |
| 7,878,181 | B2 | 2/2011 | Carns | |
| 8,656,941 | B1 * | 2/2014 | Hayward | F02K 9/58 137/221 |
| 9,033,306 | B2 * | 5/2015 | Kunau | B60C 25/145 141/38 |
| 9,080,832 | B2 * | 7/2015 | Brahler, II | F41H 13/0006 |
| 10,253,901 | B1 * | 4/2019 | Champaigne | F16K 27/048 |
| 2002/0005217 | A1 * | 1/2002 | Lyons | G05D 7/014 137/220 |
| 2006/0054848 | A1 * | 3/2006 | Vogt | F02B 37/16 251/77 |
| 2007/0284002 | A1 * | 12/2007 | Hartman | F16K 3/265 137/219 |
| 2008/0224076 | A1 * | 9/2008 | Jennings | F16K 7/20 251/122 |
| 2009/0250123 | A1 * | 10/2009 | Matsubara | F16K 27/0209 137/528 |
| 2009/0272929 | A1 * | 11/2009 | Bey | F16K 1/126 251/324 |
| 2010/0102259 | A1 * | 4/2010 | Forster | F16K 31/0651 251/129.01 |
| 2010/0187462 | A1 * | 7/2010 | Davies, Jr. | F16K 1/12 251/318 |
| 2012/0061595 | A1 * | 3/2012 | Canjuga | F16K 1/126 251/62 |
| 2012/0090715 | A1 * | 4/2012 | Fenwick | F16K 31/50 137/801 |
| 2014/0124059 | A1 * | 5/2014 | McAuliffe | F16K 31/12 137/492 |
| 2015/0008348 | A1 * | 1/2015 | Greene | F16K 31/383 251/62 |
| 2016/0376913 | A1 * | 12/2016 | Marocchini | F04D 27/0223 137/511 |
| 2017/0342853 | A1 * | 11/2017 | Schwalm | F02C 6/08 |
| 2017/0363003 | A1 * | 12/2017 | Evetts | F02C 7/18 |
| 2017/0370488 | A1 * | 12/2017 | Reinholdt | G05D 16/103 |
| 2018/0073648 | A1 * | 3/2018 | Wong | F16K 1/126 |
| 2020/0041005 | A1 * | 2/2020 | Baumann | F16K 1/38 |
| 2020/0095944 | A1 * | 3/2020 | Goodman | F16K 31/1223 |

* cited by examiner

INLINE VALVES, GAS TURBINE ENGINES WITH INLINE BLEED VALVES, AND METHODS CONTROLLING FLOW THROUGH INLINE VALVES

STATEMENT OF FEDERAL SUPPORT

This invention was made with Government support under Contract No. FA8626-16-C-2139 awarded by the United States Air Force. The Government has certain rights in the invention.

BACKGROUND

The present disclosure generally relates to fluid systems, and more particularly to controlling fluid flow in fluid systems.

Valves, such as inline valves, are commonly used to control fluid flow in gas turbine engines, generally by opening the valve when fluid communication is necessary and by closing the valve when fluid communication is not necessary. Gas turbine engines typically employ inline valves to manage airflow through the compressor during engine starting. For example, at the beginning of engine startup the inline valve is opened to limit the load imposed by the compressor on the starter, and the inline valve thereafter closed once pressure within the compressor section reaches a predetermined level. In some inline valves switching between the open state and the closed state is accomplished pneumatically, typically by selectively communicating pressurized air to a controller located within the interior of the inline valve and arranged along the valve flow path between the inlet and outlet of the valve.

Such inline valves, gas turbine engines, and methods controlling inline valves have generally been acceptable for their intended purpose. However, there remains a need in the art for improved inline valves, gas turbine engines, and methods of controlling inline valves. The present disclosure provides a solution to this need.

BRIEF DESCRIPTION

According to one embodiment, an inline valve is provided. The inline valve includes a valve body with an exterior, an inlet, and an outlet; a valve member supported within the valve body and movable between a first position and a second position, the inlet in fluid communication with the outlet in the first position, the inlet fluidly separated from the outlet in the second position; and a control manifold supported by the valve body with a reference fluid port and a control fluid port, wherein the control manifold is in pneumatic communication with the valve member through the exterior of the valve body for passive movement of valve member between the first position and the second position according to pressure at the valve body inlet.

In addition to one or more of the features described above, or as an alternative, further embodiments may include an actuator arranged within the valve body between the inlet and the outlet, wherein the valve member is slidably received within the actuator.

In addition to one or more of the features described above, or as an alternative, further embodiments may include that the actuator is in fluid communication with the reference fluid port while the valve member is in the first position.

In addition to one or more of the features described above, or as an alternative, further embodiments may include that the actuator is in fluid communication with the control fluid port while the valve member is in the second position.

In addition to one or more of the features described above, or as an alternative, further embodiments may include a selector element arranged within the control manifold and movable between a first seat and a second seat, the control fluid port in fluid communication with the valve member when the selector element is at the second seat, the reference fluid port in fluid communication with the valve member when the selector element is at the first seat.

In addition to one or more of the features described above, or as an alternative, further embodiments may include a biasing member supported within the control manifold and biasing the selector element toward the first seat.

In addition to one or more of the features described above, or as an alternative, further embodiments may include a plunger with a selector element face abutting the selector element, wherein the selector element face is tangent to the selector element.

In addition to one or more of the features described above, or as an alternative, further embodiments may include that the selector element comprises a sphere formed from a ceramic material.

In addition to one or more of the features described above, or as an alternative, further embodiments may include a pneumatic conduit fluidly coupling the control manifold with valve member.

In addition to one or more of the features described above, or as an alternative, further embodiments may include that the pneumatic conduit extends through the exterior of the valve body.

In addition to one or more of the features described above, or as an alternative, further embodiments may include a fairing having a leading edge and a trailing edge seated on the pneumatic conduit, the leading edge opposing the inlet of the valve body, the trailing edge opposing the outlet of the valve body.

In addition to one or more of the features described above, or as an alternative, further embodiments may include a control air source fluidly connected to the control port of the control manifold.

In addition to one or more of the features described above, or as an alternative, further embodiments may include a reference air source fluidly connected to the reference port of the control manifold.

According to another embodiment, a gas turbine engine is provided. The gas turbine engine includes a compressor section with a bleed port; an inline valve as recited in claim 1, wherein the inlet of the valve body is connected to the bleed port of the compressor section; a control air source fluidly connected to the control port of the control manifold; and a reference air source fluidly connected to the reference port of the control manifold.

In addition to one or more of the features described above, or as an alternative, further embodiments may include that the control air source is a stage of the compressor section fluidly downstream of the bleed port, wherein the reference air source is upstream of the bleed port.

In addition to one or more of the features described above, or as an alternative, further embodiments may include that the inline valve also includes a selector element arranged within the control manifold and movable between a first seat and a second seat, the control fluid port in fluid communication with the valve member when the selector element is at the first seat, the reference fluid port in fluid communication with the valve member when the selector element is at the first seat; a pneumatic conduit fluidly coupling the control manifold with the valve member; and an actuator arranged within the valve body between the inlet and the outlet, wherein the valve member is slidably seated on the actuator.

According to further embodiment, a method of controlling fluid flow is provided. The method includes, at an inline valve as described above, receiving a control pressure at the control fluid port; receiving a reference pressure at the reference fluid port; receiving an inlet pressure at the inlet of the valve body; and passively moving the valve member between the first position and the second position responsive to change in pressure at inlet of the valve body.

In addition to one or more of the features described above, or as an alternative, further embodiments may include that the control pressure is greater than the inlet pressure, wherein the inlet pressure is greater than the reference pressure.

In addition to one or more of the features described above, or as an alternative, further embodiments may include moving the valve member to the first position by communicating the reference pressure to the valve member.

In addition to one or more of the features described above, or as an alternative, further embodiments may include moving the valve member to the second position by communicating the control pressure to the valve member.

Technical effects of the present disclosure include the capability to actuate inline valves passively according pressure at the inline valve inlet and one of a reference pressure and a control pressure communicated through the exterior of the valve body of the inline valve. Technical effects also include the capability to provide inline valves having relatively small valve bodies in relation to flow area due at least in part to supporting the actuation manifold of the inline valve on the exterior of the valve body.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
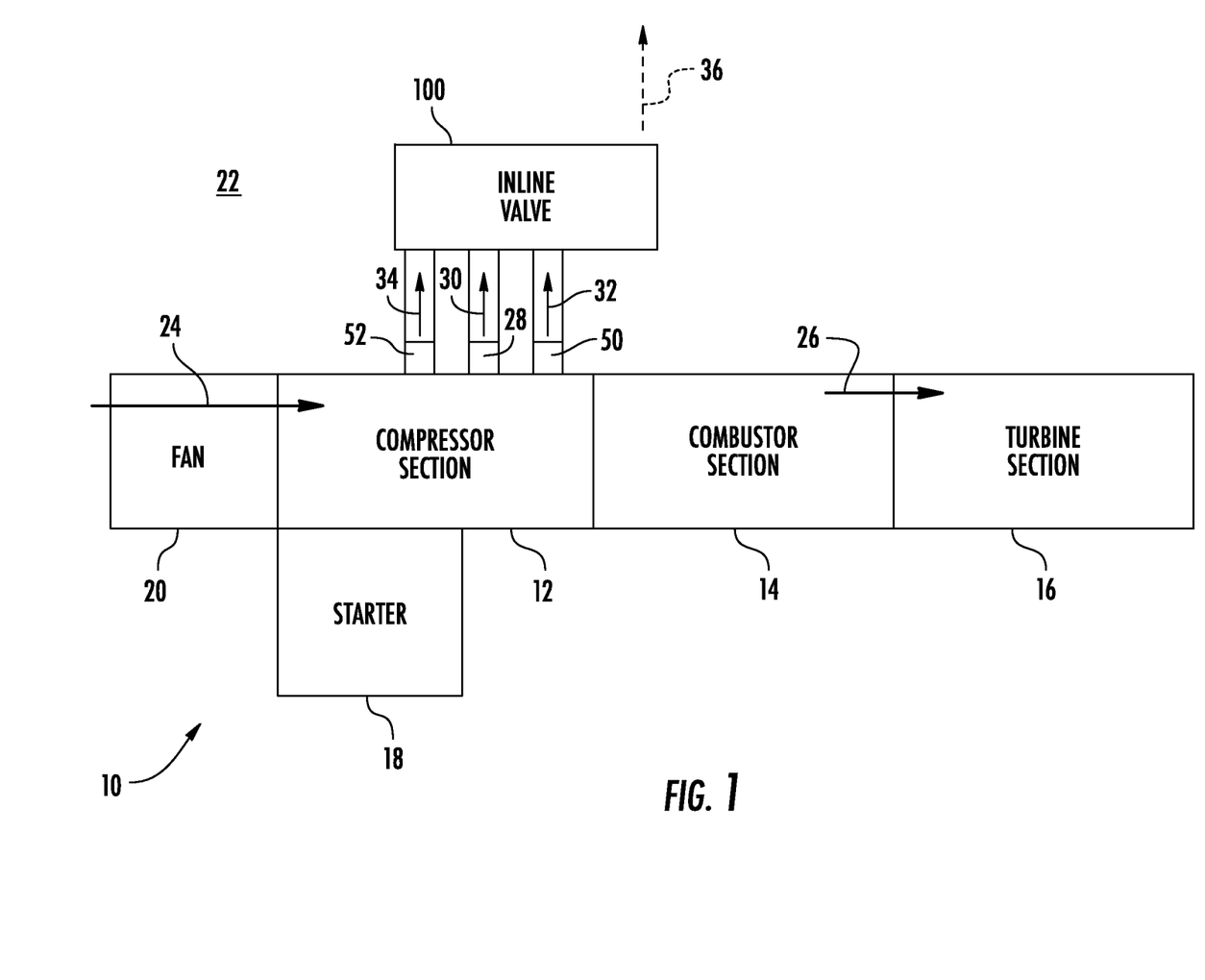
FIG. 1 is a schematic view of an inline valve constructed in accordance with the present disclosure, showing the inline valve connected to the a compressor section of a gas turbine engine.

Reference will now be made to the drawings wherein like reference numerals identify similar structural features or aspects of the subject disclosure. For purposes of explanation and illustration, and not limitation, a partial view of an exemplary embodiment of an inline valve in accordance with the disclosure is shown in FIG. 1 and is designated generally by reference character 100. Other embodiments of inline valves, gas turbine engines, and methods of controlling flow through inline valves in accordance with the present disclosure, or aspects thereof, are provided in FIGS. 2-5, as will be described. The systems and methods described herein can be used for controlling the load imposed by compressor sections during startup, such as for controlling flow through inline bleed valves in gas turbine engines, though the present disclosure is not limited to inline bleed valves or to bleed valves for gas turbine engines in general.

Referring to FIG. 1, a gas turbine engine 10 is shown. The gas turbine engine 10 includes a compressor section 12, a combustor section 14, and a turbine section 16. The gas turbine engine 10 also includes a starter 18, a fan 20, and the inline valve 100, e.g., an inline bleed valve.

The compressor section 12 is in fluid communication with the external environment 22 and is arranged to ingest therefrom and compress a working fluid flow 24. The combustor section 14 is in fluid communication with the compressor section 12 and is arranged to receive therefrom the working fluid flow 24, from which the combustor section 14 generators a flow of high pressure combustion products 26. The turbine section 16 is in fluid communication with the combustor section 14, is arranged to receive the flow of high pressure combustion products 26 from the combustor section 14, and is further arranged to expand and extract work from the high pressure combustion products 26. During normal operation, e.g., other than during engine starting, the turbine section 16 communicates portions of the work to the fan 20 and the compressor section 12. The portion of the work applied to the compressor section 12 is used to compress the working fluid flow 24.

During engine starting the amount of work available from the turbine section 16 may be insufficient to compress the working fluid flow 24 during operation. To limit the energy (work) required by the compressor section 12 during such periods of operation the gas turbine engine 10 includes the inline valve 100. In this respect the inline valve 100 is connected to a bleed port 28 located along the compressor section 12 and is configured to selectively communicate the working fluid flow 24 to the external environment 22 according to an pressure of an inlet fluid 30, pressure of a control fluid 32, and pressure of a reference fluid 34 each applied to the inline valve 100, as will be described. As will be appreciated by those of skill in the art in view of the present disclosure, this limits the work necessary to start the gas turbine engine 10, allowing the starter 18 to be relatively small in comparison to that otherwise required. In contemplated that one or more of the inlet fluid 30, control fluid 32, and the reference fluid 34 comprise compressed air.

As shown in FIG. 1, the inlet fluid 30, the control fluid 32, and the reference fluid 34 are each provided by the compressor section 12. More specifically, the control fluid 32 is obtained from a location fluidly downstream of the bleed port 28, the control fluid 32 therefore being higher in pressure than the inlet fluid 30. In this respect an inlet 110 (shown in FIG. 1) of a valve body 102 (shown in FIG. 2) is connected to the bleed port 28 of the compressor section 12, a control air source 50; a stage of the compressor section 12 fluidly downstream of the bleed port 28, is fluidly connected to a control fluid port 120 (shown in FIG. 2) of the inline valve 100; and a reference air source 52, e.g., a stage of the compressor section 12 fluidly upstream of the bleed port 28, a fan bypass duct of the gas turbine engine 10, or ambient pressure provided by the external environment 22.

The inlet fluid 30 is obtained from a location fluidly downstream of where the reference fluid 34 is obtained, pressure of the inlet fluid 30 thereby being greater than pressure of the reference fluid 34. It is to be understood and appreciated that the illustrated arrangement is for illustration purposes only and is non-limiting, and that other arrangements of the gas turbine engine 10 are possible and remain within the scope of the present disclosure. For example, the reference fluid 34 can be obtained from the external environment 22 and therefore be substantially equivalent to ambient pressure.

Figure 2:
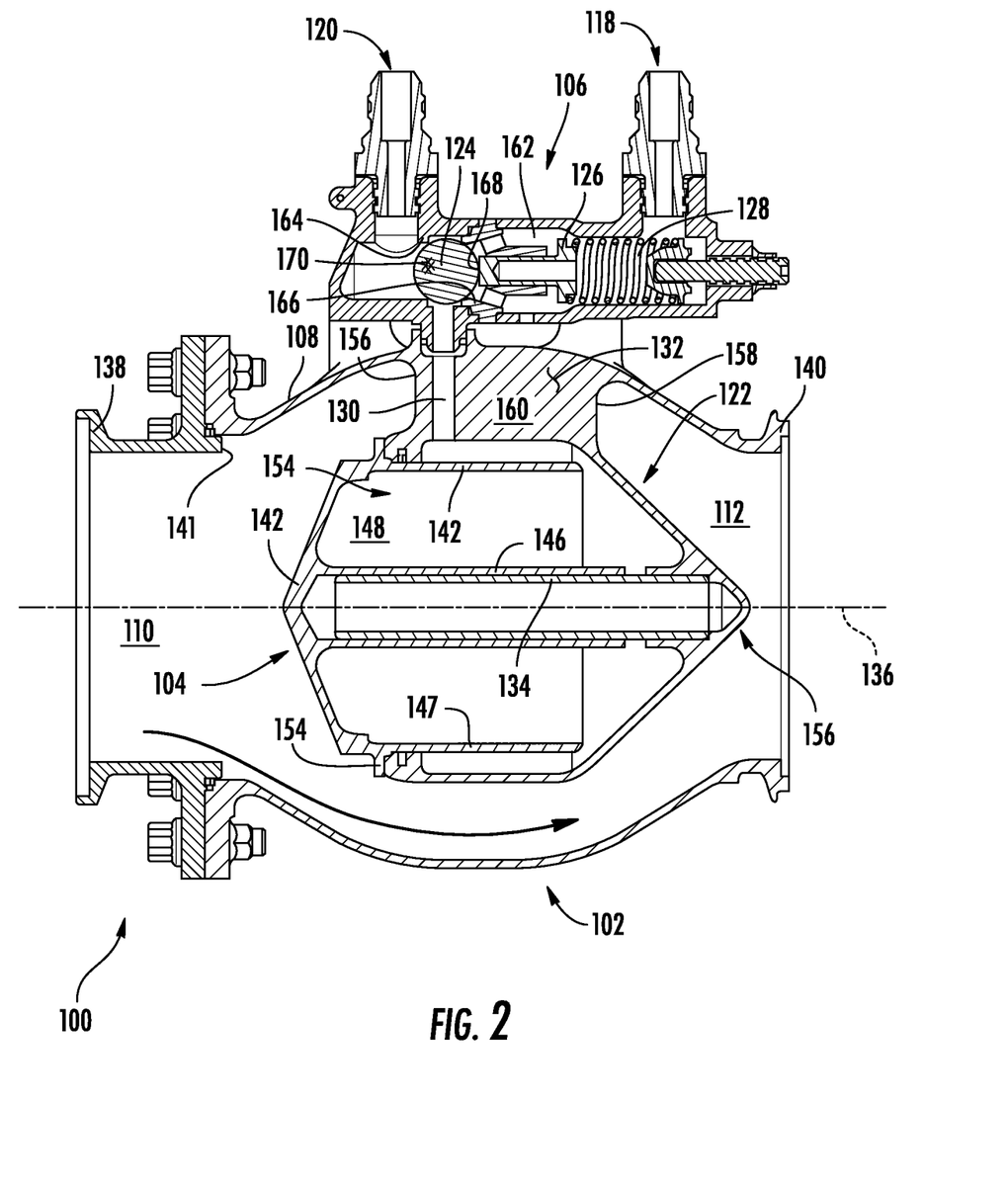
FIG. 2 is cross-sectional view of the inline valve of FIG. 1, showing a valve body with a valve member supported in the valve body and movable within the valve body according to a pressure at a control port and a reference port at a manifold mounted to the exterior of the valve body.

With reference to FIG. 2, the inline valve 100 is shown. The inline valve 100 generally includes a valve body 102, a valve member 104, and a control manifold 106. The valve body 102 has an exterior 108, an inlet 110, and an outlet 112. The valve member 104 is supported within the valve body 102 and is movable between a first position 114 (shown in FIG. 4) and a second position 116 (shown in FIG. 4), the inlet 110 in fluid communication with the outlet 112 while the valve member 104 is in the first position, the inlet 110 fluidly separated from the outlet 112 while the valve member 104 is in the second position 116. The control manifold 106 is supported by the valve body 102 and has a reference fluid port 118 and a control fluid port 120. The control manifold 106 is in pneumatic communication with the valve member 104 through the exterior 108 of the valve body 102 for passive movement of the valve member 104 between the first position 114 and the second position 116 responsive to pressure change at the inlet 110 of the valve body 102.

In the illustrated example the inline valve 100 also includes an actuator 122, a selector element 124, and a plunger 126. The inline valve 100 additionally includes a biasing member 128, a pneumatic conduit 130, a fairing 132, and a guide pin 134.

The valve body 102 defines a flow axis 136, has an inlet flange 138, and an outlet flange 140. The inlet flange 138 extends about the inlet 110, the outlet flange 140 extends about the outlet 112, and the inlet flange 138 and the outlet flange 140 are each arranged along the flow axis 136 at opposite ends of the valve body 102. An inlet seat 141 extends about the inlet 110 and is arranged to seat the valve member 104 in the second position 116 (shown in FIG. 4). The actuator 122 is arranged within the valve body 102 between the inlet 110 and the outlet 112, the valve member 104 being slidably received within the actuator 122.

The valve member 104 includes a face portion 142, a skirt portion 144, and a guide portion 146. The face portion 142 of the valve member 104 opposes the inlet 110 and inlet flange 138. The guide portion 146 is arranged along the flow axis 136, is slidable received on the guide pin 134, and extends axially from the face portion 142 of the valve member 104 along the flow axis 136 towards the outlet 112. The skirt portion 144 is also arranged along the flow axis 136, extends axially from the face portion 142 of the valve member 104 toward the outlet 112 at a location radially outward of the guide portion 146, and is slidably disposed within the actuator 122. The actuator 122 and the valve member 104 define between one another an actuator chamber 148.

The actuator 122 is arranged within the valve body 102. More specifically, the actuator 122 is arranged within the valve body 102 between the inlet 110 and the outlet 112, the valve member 104 slidably received within the actuator 122. Support is provided by the fairing 132 and/or the pneumatic conduit 130, which couple the actuator 122 to the interior surface of the valve body 102 within the interior of the valve body 102. In this respect the actuator 122 is supported within the interior of the valve body 102 by the fairing 132, is arranged along the flow axis 136, and has an open end 152 and a tapered end 150 arranged at axially opposite ends of the actuator 122. The open end 152 of the actuator 122 faces the inlet 110, slidably receives therein the valve member 104, and defines an actuator seat 154 thereabout. The tapered end 150 is defined on an end of the actuator 122 opposite the actuator seat 154 along the flow axis 136 and opposes the outlet 112.

The fairing 132 is seated on the pneumatic conduit 130 and has a leading edge 156 and trailing edge 158. The leading edge 156 opposes the inlet 110 of the valve body 102 and the trailing edge 158 opposing the outlet 112 of the valve body 102. This limits resistance presented to the inlet fluid 30 as the inlet fluid 30 traverses the valve body 102 as a flow. Between the leading edge 156 and the trailing edge 158 the fairing 132 defines an aerodynamic profile 160, e.g., an airfoil, which further limits resistance to the inlet fluid 30 traversing the valve body 102 between the inlet 110 and the outlet 112 otherwise posed by the pneumatic conduit 130. As will be appreciated by those of skill in the art, the remote placement control module on the exterior 108 of the valve body 102 allows the fairing 132 to be relatively small, increasing the effective flow area of the valve body 102 in relation to the size of the valve body 102, e.g., due to the employment of a single pneumatic conduit 130 through the fairing 132.

The pneumatic conduit 130 fluidly couples the control manifold 106 with the valve member 104. More specifically, the pneumatic conduit 130 extends through the exterior 108 of the valve body 102 and connects the actuator 122 with the control manifold 106. It is contemplated that the pneumatic conduit 130 fluidly connected either the reference fluid port 118, the control fluid port 120, or both the reference fluid port 118 and the control fluid port 120 with the with actuator chamber 148 according to disposition of the selector element 124 within the control manifold 106.

The control manifold 106 is supported by the valve body 102 outside of the valve body 102 and defines an interior channel 162. The interior channel 162 connects the reference fluid port 118 with the control fluid port 120 and the pneumatic conduit 130 for selective fluid communication therebetween, and has arranged therein a first seat 164 and a second seat 166. The selector element 124, plunger 126, and biasing element 128 are each arranged within the control manifold 106 between the reference fluid port 118 and the second seat 166. Although a particular arrangement of the selector element 124, plunger 126, and the biasing element 128 are shown and described herein, it is to be understood and appreciated that other arrangements of these elements are possible within the scope of the present disclosure.

The selector element 124 is arranged within the control manifold 106 and is movable between the first seat 164 and the second seat 166. The control fluid port 120 is in fluid communication with the valve member 104 when the selector element 124 abuts the second seat 166. This places the reference fluid port 118 in fluid communication with the actuator chamber 148 through the pneumatic conduit 130. The reference fluid port 118 is in fluid communication with the valve member 104 when the selector element 124 abuts the second seat 166. When the selector element 124 is driven against the second seat 166 the reference fluid port 118 is fluidly separated from the valve member 104 and the control fluid port 120 is in fluid communication with the with the valve member 104. This places the control fluid port 120 in fluid communication with the actuator chamber 148 through the pneumatic conduit 130.

The biasing member 128, which can include a spring or flexure structure, is supported within the control manifold 106 and biases the selector element 124 toward the first seat 164. More specifically, the biasing member 128 exerts a biasing force 36 (shown in FIG. 3) on the selector element 124 in the direction of the first seat 164 corresponding to a spring constant of the biasing member 128. The plunger 126 is arranged between the biasing member 128 and the selector element 124 to communicate the biasing force 36 to the selector element 124, and in this respect abuts the selector element 124 on a side of the selector element 124 opposite the first seat 164. It is contemplated that the plunger 126 have a selector element face 168, and that the selector element face 168 is tangent to the surface of selector element 124. As shown in FIG. 2 the selector element 124 is a sphere formed from a ceramic 170, e.g., a ceramic coating or entirely from ceramic. Employment of a spherical shape, e.g., a substantially perfect sphere, allows the inline valve 100 to operate irrespective of the orientation of the selector element 124. Employment of the ceramic 170 limits wear and/or provides thermal insulation between fluids flowing passed the selector element 124, improving reliability of the inline valve 100. Examples of suitable ceramic materials include silicon nitride by way of non-limiting example.

Figure 3:
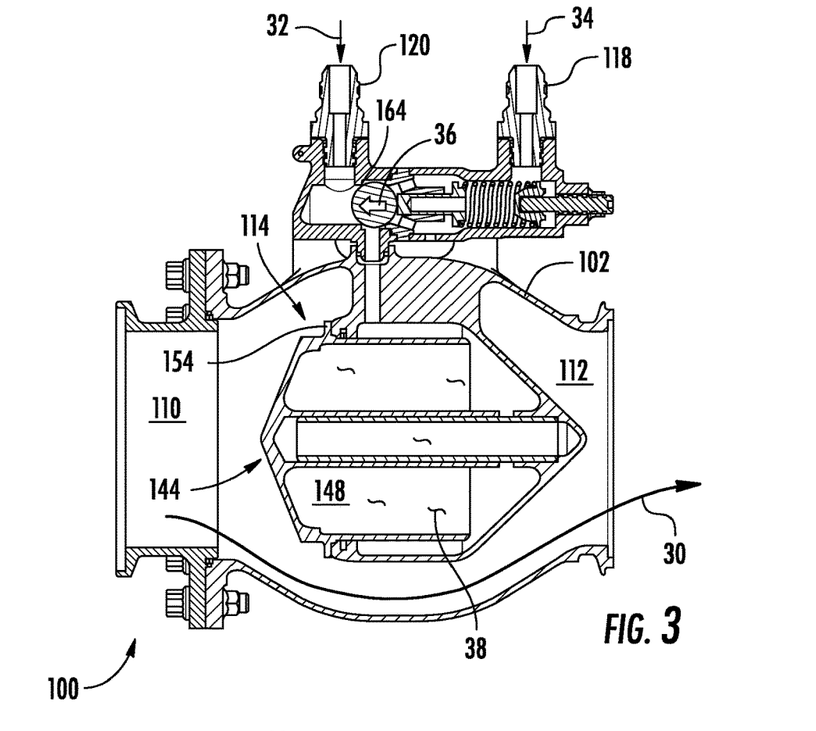
FIG. 3 is a cross-sectional view of the inline valve of FIG. 1, showing the valve member in a first position responsive to the reference pressure and wherein the valve body inlet is in fluid communication with the valve body outlet.

With reference to FIG. 3, the inline valve 100 is shown with the valve member 104 in the first position 114. In the first position 114 the valve member 104 is seated against the actuator seat 154. So seated the inlet 110 of the valve body 102 is in fluid communication with the outlet 112 of the valve body 102. As such the inline valve 100 assumes an open state, and the inlet fluid 30 traverses the inline valve 100 from the inlet 110 and the outlet 112, and is communicated from the compressor section 12 (shown in FIG. 1) to the external environment 22 (shown in FIG. 1) through the inline valve 100.

The actuator 122 is in fluid communication with the reference fluid port 118 while the valve member 104 is in the first position 114. In this respect the inline valve 100 assumes the first position 114 when the inlet fluid 30 exerts force on the valve member 104 sufficient to drive the valve member 104 against the actuator seat 154. The magnitude of the force required to drive the valve member 104 against the actuator seat 154 in turn depends on pressure of the fluid 38 resident within the actuator chamber 148. Pressure of the fluid 38 is commensurate with pressure one fluid at one of the reference fluid port 118 and the control fluid port 120. In this respect, when force associated with pressure of the control fluid 32 is smaller than the sum of the biasing force 36 and force associated with pressure of the reference fluid 34, the selector element 124 is driven against the first seat 164, and pressure within the actuator chamber 148 is relatively low. This allows inlet fluid 30 to generate sufficient force to place the inline valve 100 in an open state, e.g., by driving the valve member 104 against the actuator seat 154, when pressure of the inlet fluid 30 is relatively low, e.g., during starts of the gas turbine engine 10 (shown in FIG. 1).

It is contemplated that the inline valve 100 remain in the open state, e.g., the valve member 104 displaced from the inlet seat 141 and/or abutting the actuator seat 154, until pressure of the inlet fluid 30 increases such that the gas turbine engine 10 (shown in FIG. 1) generates power sufficient for operation and that it is no longer necessary to bleed working fluid from the compressor section 12 (shown in FIG. 1) by communicating the inlet fluid 30 to the external environment 22. Accordingly, once pressure of the inlet fluid 30 rises to a predetermined level, the valve member 104 moves to the second position 116 (shown in FIG. 4).

Figure 4:
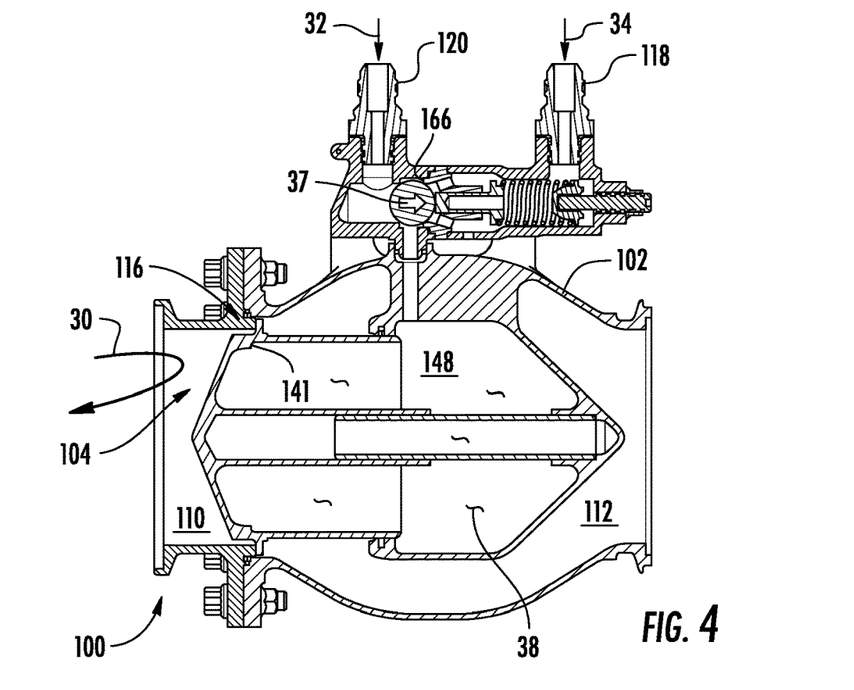
FIG. 4 is a cross-section view of the inline valve of FIG. 1, showing the valve member in a second position responsive to the control pressure and wherein the valve body inlet is fluidly separated from the valve body outlet.

With reference to FIG. 4, the inline valve 100 is shown with the valve member 104 in the second position 116. In the second position 116 the valve member 104 seats against the inlet seat 141. So seated the inlet 110 of the valve body 102 is fluidly separated from the outlet 112 of the valve body 102 by the valve member 104. As such the inline valve 100 assumes a closed state, and substantially no communication of the inlet fluid 30 through the inline valve 100 occurs.

The actuator 122 is in fluid communication with the control fluid port 120 while the valve member 104 is in the second position 116. In this respect the inline valve 100 assumes the second position 116 when force exerted on the valve member 104 by the fluid 38 within the actuator chamber 148 exceeds that of force exerted on the valve member 104 by the inlet fluid 30, which when present causes the valve member 104 to move between the first position 114 (shown in FIG. 1) to the second position 116. As explained above, the magnitude of the force required to drive the valve member 104 against the inlet seat 141 depends on pressure of the fluid 38 resident within the actuator chamber 148. Pressure of the fluid 38 in turn depends upon pressure at the reference fluid port 118 and the control fluid port 120.

When the force associated with pressure of the control fluid 32 is greater than the sum of the biasing force 36 and the force associated with pressure of the reference fluid 34, the selector element 124 is driven against the second seat 166, and pressure within the actuator chamber 148 become relatively high due to fluid communication between the control fluid port 120 and actuator chamber 148. This allows the fluid 38 resident within the actuator chamber 148 to generate force sufficient to place the inline valve 100 in a closed state, e.g., by driving the valve member 104 against the inlet seat 141, when pressure of the fluid 38 within the actuator chamber 148 is relatively high, e.g., during steady state operation of the gas turbine engine 10 (shown in FIG. 1). Notably, movement of the valve member 104 between the first position 114 and the second position 116 passive, e.g., no control signal is applied to the inline valve 100, and the inline valve 100 responds pressure of the inlet fluid 30 according to the spring constant of the biasing member 128, the pressure of the inlet fluid 30, the pressure of the control fluid 32, and the pressure of the reference fluid 34.

Figure 5:
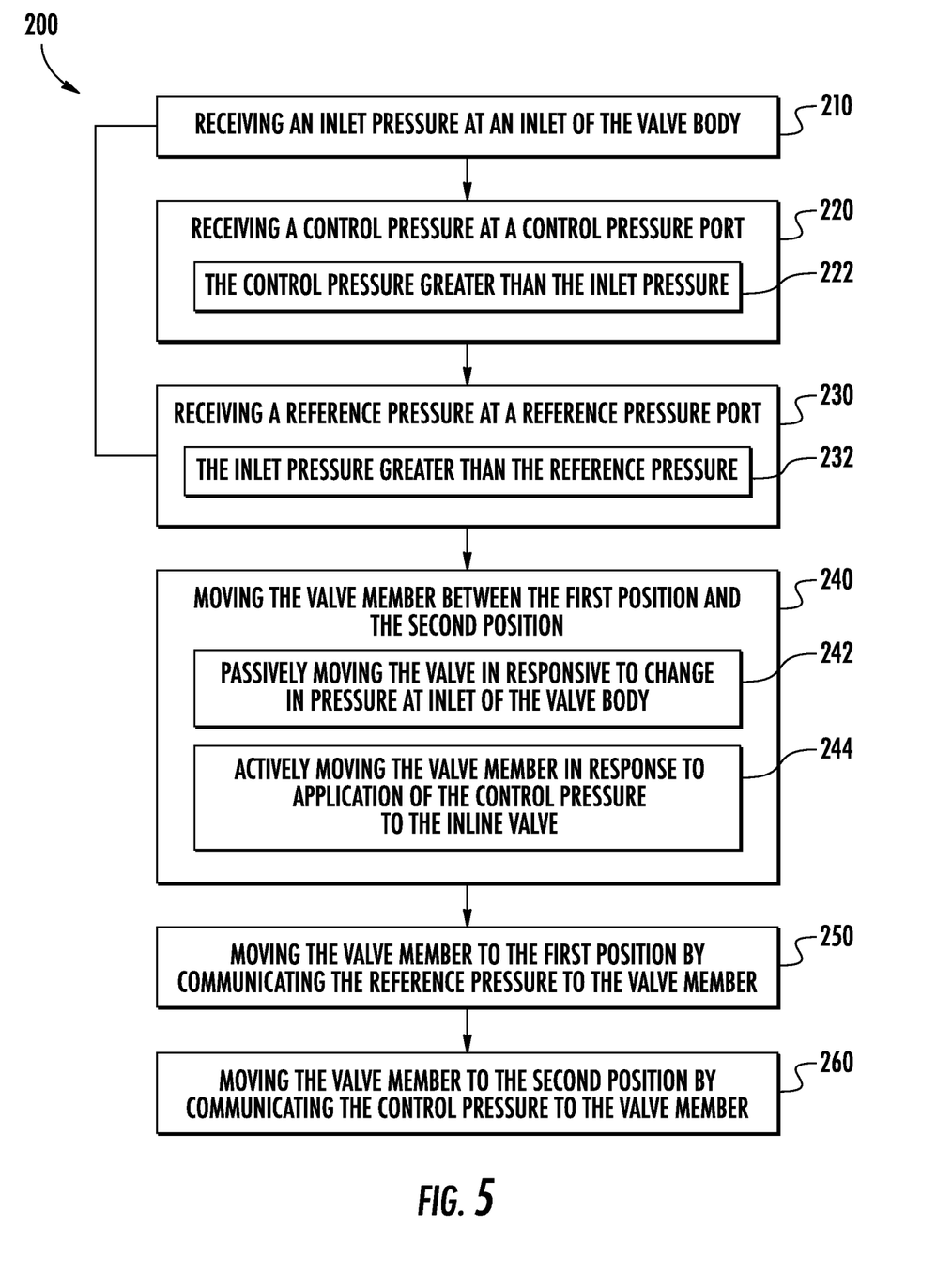
FIG. 5 is a block diagram of a method of controlling fluid flow through an inline valve, showing steps of the method according to an illustrative embodiment of the method.

With reference to FIG. 5, a method 200 of controlling flow through an inline valve, e.g., the inline valve 100 (shown in FIG. 1), is shown. As shown with the bracket 202, the method 200 generally includes applying three pressures to an inline valve, e.g., the inline valve 100. In this respect an inlet fluid, e.g., the inlet fluid 30, is communicated to an inlet, e.g., the inlet 110 (shown in FIG. 1), of the inline valve, as shown with box 210. A control fluid, e.g., the control fluid 32 (shown in FIG. 1), is also communicated to a control fluid port, e.g., the control fluid port 120 (shown in FIG. 2), of the inline valve, as shown with box 220. Further, a reference fluid, e.g., the reference fluid 34 (shown in FIG. 1), is communicated to a reference fluid port, e.g., the reference fluid port 118 (shown in FIG. 2), of the inline valve, as shown with box 230. It is contemplated that the pressure of the control fluid be greater than pressure of the inlet fluid during operation of the inline valve, as shown with box 222. Further, as shown with box 232, it is also contemplated that the pressure of inlet fluid be greater than the pressure of the reference fluid during operation of the inline valve.

As shown with box 240, the method 200 includes moving a valve member, e.g., the valve member 104, between the first position 114 and the second position 116. Movement of the valve member between the first position and the second position is accomplished passively, as shown with box 242. Movement of the valve member between the first position and the second position can also be accomplished by closing the inline valve responsive to increase in pressure at the both the inlet and the control fluid port of the inline valve, as shown with box 244. As shown with box 250, movement of the valve member to the first position is accomplished by communication of pressure of the reference fluid to the valve member. As shown with box 260, movement of the valve member to the second position is accomplished by communication of the control fluid to the valve member.

Inline valves are typically operated by pneumatic controllers, which control the muscle pressure applied to the inline valve and which feed the muscle pressure into an internal actuator chamber to actuate the inline valve. The pneumatic controller is typically mounted remotely and actively controlled by an actuation signal, the pneumatic controller communicating muscle pressure to the inline valve actuator chamber sufficient to actuate the inline valve in response to an electronic signal received by the pneumatic controller.

In embodiments described herein inline valves are passively actuated. In this respect actuation of the inline valve is according solely to conditions present at the inlet, the outlet, an actuation pressure port, and a reference fluid port defined by a valve body of the inline valve. In accordance with certain embodiments inline valves described herein include an actuator supported by the valve body, the reference fluid port and the actuation pressure port defined by the actuator, and the actuator housing a selector member and a biasing member.

The selector member is movable according to forces exerted thereon according to a difference between pressures at the control port and the reference port, and force exerted by the biasing member on the selector member. When difference between pressures at the control port and the reference port exceeds that exerted on the selector member by the biasing member, the selector member fluidly connects the control fluid port to the actuator chamber. When difference between pressures at the control port and the reference port is below that of exerted on the selector member by the biasing member, the selector member fluidly connects the reference fluid port to the actuator chamber. Net force on the valve member is a function of pressure within the actuator chamber and the inlet of the valve body, the force exerted by the biasing member on the selector member thereby controlling the inlet pressure at which the valve actuates.

Advantageously, the above-described inline valves require no remotely-mounted, active control mechanisms, such as solenoids. No external signal is therefore needed for control. Further, by having a selector member mounted directly on the exterior of valve body, no space within the valve body need by occupied by the selector member. This allows the valve body to have greater flow area than would be the case were the selector member mounted within an interior of the valve body.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inline valve, comprising:
   a valve body with an exterior, an inlet, and an outlet;
   a valve member supported within the valve body and movable between a first position and a second position, the inlet in fluid communication with the outlet in the first position, the inlet fluidly separated from the outlet in the second position; and
   a control manifold supported by the valve body with a reference fluid port and a control fluid port, wherein the control manifold is in pneumatic communication with the valve member through the exterior of the valve body for passive movement of valve member between the first position defined by a first valve seat and the second position defined by a second valve seat according to pressure at the valve body inlet,
   wherein the valve body inlet, the control fluid port and the reference fluid port are connected to a compressor and receive fluid from the compressor without operation of a solenoid.

2. The inline valve as recited in claim 1, further comprising an actuator arranged within the valve body between the inlet and the outlet, wherein the valve member is slidably received within the actuator.

3. The inline valve as recited in claim 2, wherein the actuator is in fluid communication with the reference fluid port while the valve member is in the first position.

4. The inline valve as recited in claim 2, wherein the actuator is in fluid communication with the control fluid port while the valve member is in the second position.

5. The inline valve as recited in claim 1, further comprising a selector element arranged within the control manifold and movable between a first seat and a second seat, the control fluid port in fluid communication with the valve member when the selector element is at the second seat, the reference fluid port in fluid communication with the valve member when the selector element is at the first seat.

6. The inline valve as recited in claim 5, further comprising a biasing member supported within the control manifold and biasing the selector element toward the first seat.

7. The inline valve as recited in claim 5, further comprising a plunger with a selector element face abutting the selector element, wherein the selector element face is tangent to the selector element.

8. The inline valve as recited in claim 5, wherein the selector element comprises a sphere formed from a ceramic material.

9. The inline valve as recited in claim 1, further comprising a pneumatic conduit fluidly coupling the control manifold with valve member.

10. The inline valve as recited in claim 9, wherein the pneumatic conduit extends through the exterior of the valve body.

11. The inline valve as recited in claim 9, further comprising a fairing having a leading edge and a trailing edge seated on the pneumatic conduit, the leading edge opposing the inlet of the valve body, the trailing edge opposing the outlet of the valve body.

12. The inline valve as recited in claim 1, further comprising a control air source fluidly connected to the control port of the control manifold.

13. The inline valve as recited in claim 1, further comprising a reference air source fluidly connected to the reference port of the control manifold.

14. A gas turbine engine, comprising:
a compressor section with a bleed port;
an inline valve that includes:
   a valve body with an exterior, an inlet, and an outlet;
   a valve member supported within the valve body and movable between a first position and a second position, the inlet in fluid communication with the outlet in the first position, the inlet fluidly separated from the outlet in the second position; and
   a control manifold supported by the valve body with a reference fluid port and a control fluid port, wherein the control manifold is in pneumatic communication with the valve member through the exterior of the valve body for passive movement of valve member between the first position defined by a first valve seat and the second position defined by a second valve seat according to pressure at the valve body inlet, wherein the inlet of the valve body is connected to the bleed port of the compressor section;
   wherein the valve body inlet, the control fluid port and the reference fluid port are connected to the compressor and receive fluid from the compressor without operation of a solenoid.

15. The gas turbine engine as recited in claim 14, wherein the control air source is a stage of the compressor section fluidly downstream of the bleed port, wherein the reference air source is upstream of the bleed port.

16. The gas turbine engine as recited in claim 14, wherein the inline valve further comprises:
a selector element arranged within the control manifold and movable between a first seat and a second seat, the control fluid port in fluid communication with the valve member when the selector element is at the first seat, the reference fluid port in fluid communication with the valve member when the selector element is at the first seat;
a pneumatic conduit fluidly coupling the control manifold with the valve member; and
an actuator arranged within the valve body between the inlet and the outlet, wherein the valve member is slidably seated on the actuator.

* * * * *